United States Patent
Iellimo et al.

(10) Patent No.: US 11,370,613 B2
(45) Date of Patent: Jun. 28, 2022

(54) PALLET BAY GUIDE SYSTEM

(71) Applicant: FRAZIER INDUSTRIAL COMPANY, Long Valley, NJ (US)

(72) Inventors: Domenick Iellimo, Forked River, NJ (US); Aaron Iellimo, Califon, NJ (US)

(73) Assignee: Frazier Industrial Company, Long Valley, NJ (US)

(*) Notice: Subject to any disclaimer, the term of this patent is extended or adjusted under 35 U.S.C. 154(b) by 41 days.

(21) Appl. No.: 16/891,375

(22) Filed: Jun. 3, 2020

(65) Prior Publication Data
US 2020/0290806 A1    Sep. 17, 2020

Related U.S. Application Data

(63) Continuation of application No. 16/291,190, filed on Mar. 4, 2019, now Pat. No. 10,752,441.

(51) Int. Cl.
*B65G 1/04* (2006.01)
*B65D 19/42* (2006.01)

(52) U.S. Cl.
CPC .......... *B65G 1/0492* (2013.01); *B65D 19/42* (2013.01); *B65G 2201/0267* (2013.01)

(58) Field of Classification Search
CPC .......... B65G 1/0492; B65G 2201/0267; B65G 2207/40; B65D 19/42; B07C 3/087
See application file for complete search history.

(56) References Cited

U.S. PATENT DOCUMENTS

| | | | | |
|---|---|---|---|---|
| 2,905,445 | A * | 9/1959 | Blum | E04F 11/181 256/65.03 |
| 3,124,402 | A * | 3/1964 | Rhoads | A47B 88/483 312/350 |
| 4,197,047 | A | 4/1980 | Haldimann | |
| 4,341,313 | A | 7/1982 | Doring | |
| 5,137,159 | A | 8/1992 | Collins | |
| 5,181,815 | A | 1/1993 | Haberkorn | |
| 5,273,170 | A | 12/1993 | Azzopardi | |
| 5,419,444 | A | 5/1995 | Strom | |
| 5,524,776 | A | 6/1996 | Hall et al. | |
| 5,845,795 | A * | 12/1998 | Mulholland | A47B 47/027 211/192 |
| 5,967,728 | A * | 10/1999 | Gales | B65G 1/0478 211/151 |
| 6,231,284 | B1 * | 5/2001 | Kordel | B65D 19/44 108/55.3 |
| 6,260,719 | B1 | 7/2001 | Azzopardi | |
| D492,834 | S * | 7/2004 | Tomes | D34/38 |
| 7,784,407 | B2 * | 8/2010 | Di Rosa | B65G 1/0414 104/48 |

(Continued)

*Primary Examiner* — Ko H Chan
(74) *Attorney, Agent, or Firm* — Dilworth & Barrese, LLP

(57) ABSTRACT

A storage system having e.g., side-by-side dual pallet bays is provided. The system includes a single level or stacked multilevel storage bay. Each bay is defined by a series of vertically extending supports and a central divider for storing two rows of pallets. Preferably, there are no vertical supports extending up from the central divider. Rails are provided on both sides of each row for supporting pallets and for pallet transportation/inventory carts to travel under the pallets. Side and center guides having camming surfaces are provided to properly position the pallets in the bays as they are loaded from a forklift.

20 Claims, 6 Drawing Sheets

(56) References Cited

U.S. PATENT DOCUMENTS

| | | | |
|---|---|---|---|
| 9,133,979 B2* | 9/2015 | Dewaele | F16M 11/045 |
| 9,266,673 B2 | 2/2016 | Hamby | |
| 9,714,141 B2* | 7/2017 | Felton | B65G 15/08 |
| 9,856,088 B1* | 1/2018 | Riggs | B65G 39/16 |
| 11,084,622 B2* | 8/2021 | Brumm | B65G 1/02 |
| 2002/0043508 A1* | 4/2002 | Lewis | A47B 57/44 |
| | | | 211/26 |
| 2004/0155003 A1* | 8/2004 | Anderson | A47B 47/021 |
| | | | 211/191 |
| 2013/0129453 A1* | 5/2013 | Salichs | B65G 1/065 |
| | | | 414/277 |
| 2020/0283228 A1 | 9/2020 | Iellimo et al. | |

* cited by examiner

PALLET BAY GUIDE SYSTEM

CROSS REFERENCE TO RELATED APPLICATIONS

This application claims priority as a Continuation of Ser. No. 16/291,190, filed Mar. 4, 2019, the contents of which are incorporated herein in their entirety.

BACKGROUND

The disclosure relates to systems for storing, transporting and managing pallets of goods and more particularly, to a storage bay that can be accessed by a forklift, which can lift and transport heavy pallets of goods onto support surfaces.

Storage systems are used in warehouses, department stores, cold storage areas and other storage facilities to store containers of goods. Certain storage systems employ extensive storage rack systems, often called deep rack storage, to store large amounts of a variety of different products. Some of these systems have columns formed of rows of storage bays stacked on top of each other, with two to seven or higher levels and no aisles between columns of storage bays.

Due to the density of the storage area and the limited sight lines and access, it can be time consuming and present logistical problems to maintain accurate inventory records of the goods remaining in storage on the racks. It can also be inconvenient to access goods in the middle of a rack, which is not accessible to a forklift. Some conventional storage systems employ automated mobile data collection and pallet transportation carts that travel under the pallets in storage racks and record inventory information as well as transport pallets within the row. These pallet carts can travel on rail systems located under the pallet storage racks. The bays can be 250 feet long, or longer. Thus, to bring a pallet from one end of the bay to the other, or from a central portion of the bay to an end, an automatically raiseable platform on the cart is used to lift the pallet and transport it to the desired location in the bay.

A conventional multi-level, multi-column rack storage system with no aisles between many of the columns of storage rows of is shown generally in FIG. 1 as a rack storage system 100. Rack storage system 100 includes an array of vertical supports 110, which support horizontal beams 115, to provide structural support. Storage system 100 also includes an array of support rails 120. Rails 120 include a pallet support surface 121, on which a plurality of pallets 130, with a variety of goods 131 are supported.

As indicated above, modern storage systems commonly employ a plurality of robotic pallet transportation carts 140, for both transporting pallets throughout storage system 100 and optionally for collecting inventory information. Pallet transportation cart 140 includes a raiseable surface 160, which can be raised up until it contacts and lifts the bottom of pallet 130. Cart 140 also includes four automatically driven wheels 170. Wheels 170 travel on a cart transportation surface 125 of rail 120. Thus, rails 120 extend into a pallet storage bay 180 and permit carts 140 to travel under pallets 130 along the entire length of each bay 180.

Pallet storage bay 180 is one pallet wide. It is designed to be accessed by a conventional forklift, with a single fork for lifting and transporting a single pallet. However, modern storage facilities have begun to use the dual pallet forklifts. A dual pallet forklift 200 with a double fork 250 is shown generally in FIG. 2. As evident from FIG. 2, double fork 250 is designed to lift and transport two pallets at the same time. However, conventional pallet storage rack systems with pallet transportation carts traveling under the racks of pallets are not sufficiently compatible with dual pallet forklifts. It can be difficult, particularly when a storage bay is three, four or five rows high, to conveniently load or unload one or two pallets at a time, into a conventionally designed bay. Accordingly, it can be necessary to use a dual fork forklift to transport the pallets around the facility, but to load and unload the pallets onto the rack one pallet at a time.

Accordingly, an improved system for storing and transporting pallets of goods that overcomes drawbacks of the prior art is desirable.

SUMMARY

Generally speaking, in accordance with the invention, a storage system having side-by-side dual pallet bays and pallet guides to properly position the pallets is provided. The system includes a single level or stacked multilevel storage bay, extending lengthwise from a front, proximal end to a rear, distal end. Each single or side-by-side bay is defined by a series of vertically extending supports. If the storage system is multi-level, horizontal beams extend across the width of the storage bay and a second bay is positioned directly over the first bay, and so forth. Even if the storage bay is a single level, the bay should be raised to provide room for a pallet transportation cart to travel under the rack of stored pallets.

From the perspective of viewing into the bay, from front-to-rear, the system includes a left-side pallet row and a right-side pallet row. Each left-side pallet row and right-side pallet row include a left and right pair of a left-side pallet support surface and a right-side pallet support surface. Each left-side pallet support surface and right-side pallet support surface are spaced slightly narrower than the approximate width of a typical pallet (e.g., spaced less than 36"), to provide a surface for supporting a row of pallets extending into the bay. Bays can be 100, 200, or 250 feet deep, or deeper.

The left-side pallet row and right-side pallet row are divided by a central divider. The central divider includes the right side of the left-side pallet row and the left side of the right-side pallet row. There should be no vertical supports extending up from the central divider, at least at the front of each bay and preferably, along the entire length of the central divider. The lack of vertical supports permits the pallets to be stored more closely together.

Each bay also includes a pair of pallet cart rails, extending down the length of the left-side pallet row and the right-side pallet row. The pallet cart rails are located below and inside the spacing of the pair of left-side pallet support surface and right-side pallet support surface. A pallet cart, which can be automated and can be provided to move the pallets and/or collect information regarding the inventory of the pallets includes wheels designed to ride on the rails. The cart is thin enough in height, and the wheels on the cart are positioned such that the top of the cart is below the left-side and right-side pallet support surfaces. Therefore, the cart can travel on the pallet cart rails, underneath a row of pallets located in the storage bay. It can be used to transport pallets (and goods) throughout the bay.

The left-side and right-side pallet rows should be spaced closely enough so that the pallets can be positioned close enough to be installed and removed by a dual pallet forklift. Thus, the central divider should be narrow enough to space the pallets close enough to be engaged by a dual fork forklift. In addition, centering cams (guide ramps) can be provided to help properly position a pallet on the support surface, which may be tens of feet off the ground, as it is loaded into or removed from the bay.

Other objects, advantages and embodiments of the invention will be apparent from the specification and the drawings and the scope of the invention will be indicated in the claims.

BRIEF DESCRIPTION OF THE DRAWINGS

Throughout the specification, like reference numerals will be used to indicate similar elements.

DETAILED DESCRIPTION OF THE PREFERRED EMBODIMENTS

The present disclosure may be understood more readily by reference to the following detailed description of the disclosure, taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
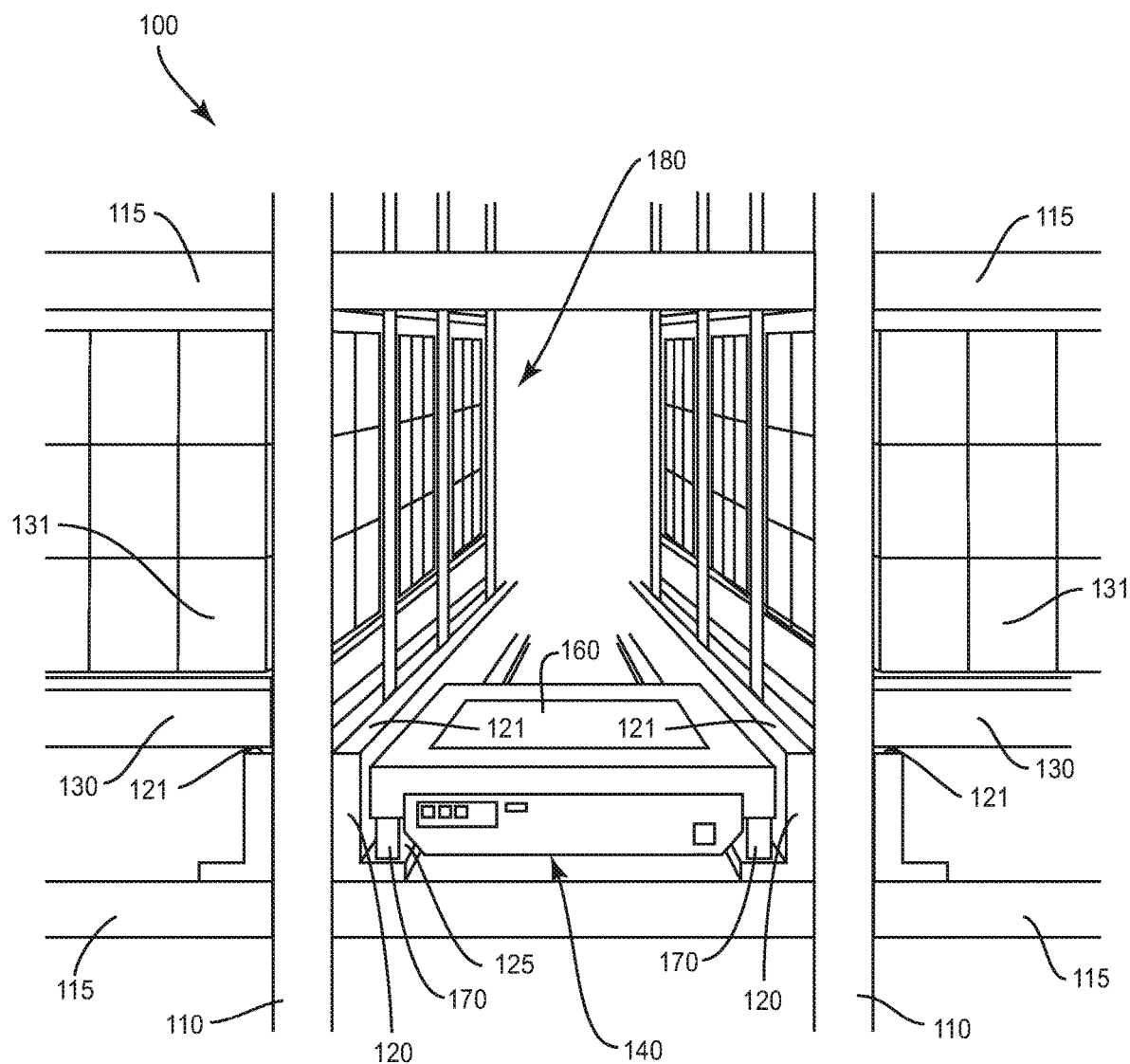
FIG. 1 is a perspective view of a conventional rack storage system.
Figure 2:
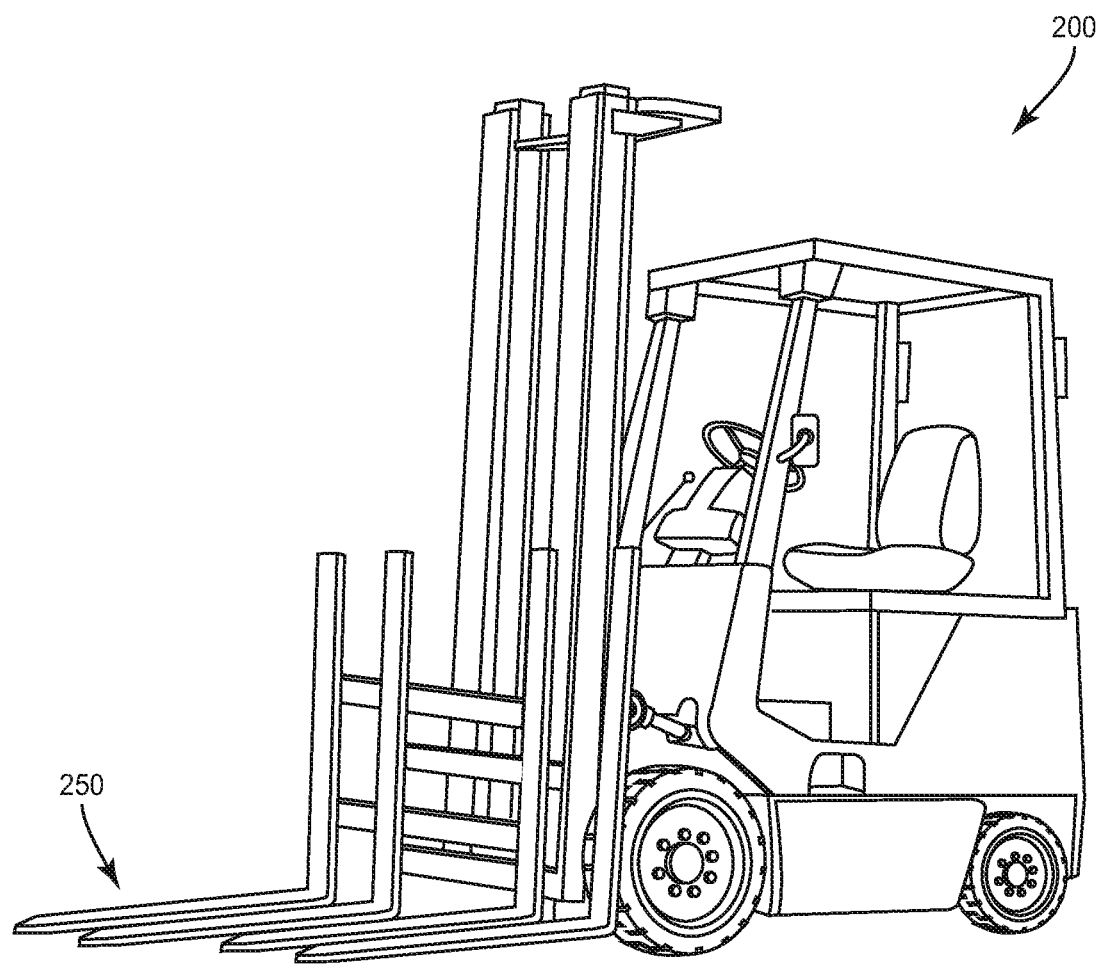
FIG. 2 is a perspective view of a double-fork forklift.
Figure 3:
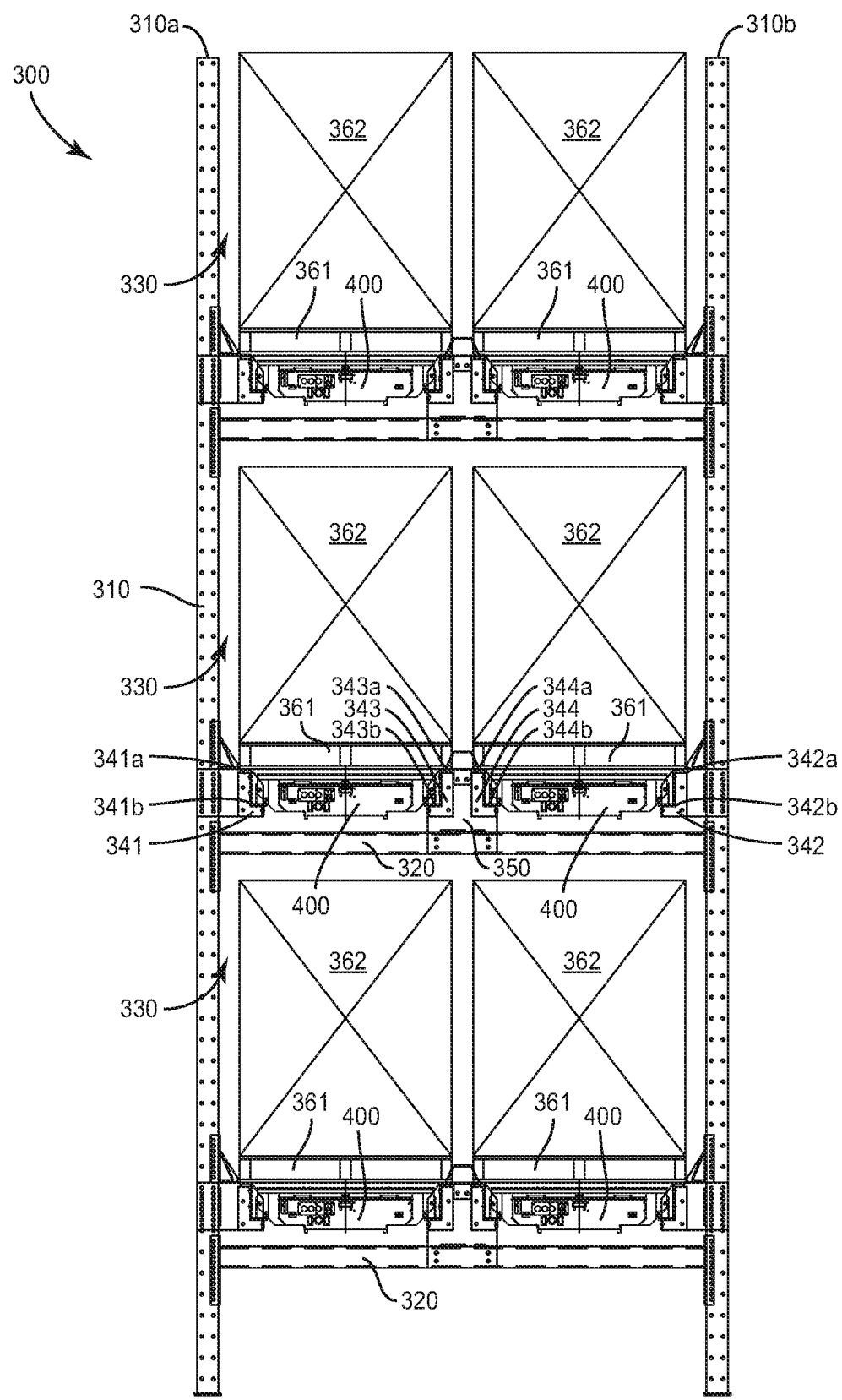
FIG. 3 is a front view of a storage system in accordance with an embodiment of the invention.

FIG. 3 shows one column of a storage rack system 300 in accordance with a preferred embodiment of the invention. System 300 includes a plurality of vertically rising vertical supports 310 having horizontal supports 320 connected therebetween. The pair of vertical supports 310 with the horizontal support 320 therebetween define a dual pallet storage bay 330. From the perspective of looking from a near proximal end lengthwise to a far distal end of storage bay 330 defines a left side defined by left vertical support 310a and a right side defined by a right vertical support 310b. A plurality of storage bays 330 can be stacked on top of each other and positioned side-to-side with each other.

Each storage bay 330 also includes a central divider 350, which is supported by horizontal beam 320. Central divider 350 preferably does not have any vertical supports rising therefrom. A left-side outer support rail 341 is attached to left vertical support 310a; a right-side outer support rail 342 is attached to right vertical support 310b; a left side inner support rail 343 is attached to the left side of central divider 350; and a right side inner support rail 344 is attached to the right side of central divider 350.

In one embodiment of the invention, the lowest storage bay does not have a horizontal beam extending across the vertical supports. In this embodiment of the invention, the outer support rails for the lowest bay are attached to the vertical supports as otherwise discussed herein, and the inner support rails are supported by the ground, e.g., resting on the ground/floor or supported by a post or stanchion, which rests on the ground/floor. With this embodiment of the invention, when there are no pallets stored in this lower storage bay, it is convenient to walk through the storage bay or to drive a floor cleaner or other vehicle into the storage bay, without the obstruction of the horizontal beam or otherwise.

Support rails 341-344 can be formed with an "L" shaped cross-section, with a vertical leg and a horizontal leg. The upper surface of the vertical leg of support rails 341-344 forms a plurality of pallet supporting surfaces 341a-344a, respectively. The upper surface of the horizontal leg forms a plurality of cart supporting surface 341b-344b, respectively. Pallet supporting surfaces 341a-344a are used to support a row of pallets 361 loaded with goods 362. The row of pallets can be 100 feet deep, 250 feet deep or deeper.

Figure 4:
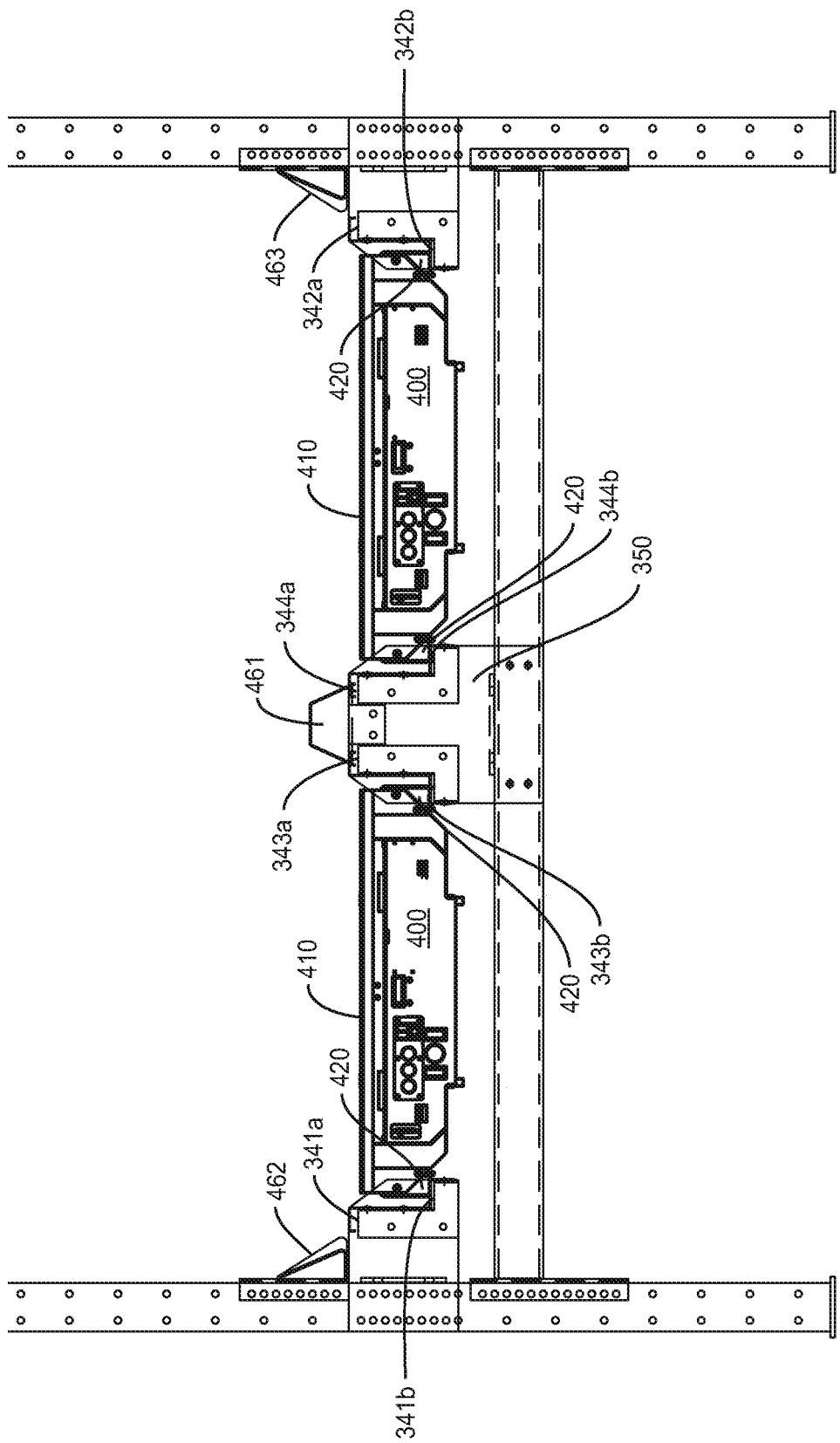
FIG. 4 is an enlarged partial front view of a portion of the storage system of FIG. 3.

Referring to FIG. 4, a pallet cart 400 includes an upper surface 410. Upper surface 410 includes a raiseable platform. If cart 400 is positioned under a pallet 361 and the platform is raised, cart 400 can be used to lift and transport pallet 361 and goods 362 to a selected position within bay 330. When positioned at an end of the bay, one or two pallets 361 with goods 362 can be removed from bay 330 with a forklift.

Cart 410 can include four wheels 420, which ride on cart surfaces 341b-344b. Cart 400 can include a drive motor and a battery for driving the motor. It can also include RF transponders, memory and wireless and wired connections for receiving instructions and/or transmitting data, such as inventory data detected as cart 400 travels under pallets 362, along the length of bay 330.

It is preferred to provide each bay 330 with centering (camming) guide ramps, for the proper positioning of the pallets during loading and unloading. This permits narrower bays and easier loading. Accordingly, center divider 350 includes a two-sided centering guide 461 to help guide the pallets onto pallet surface 343a or 344a. Similarly, a left side centering (camming) guide 462 and a right side centering (camming) guide 463 are attached to left vertical support 310a and right vertical support 310b, respectively, to properly position the pallets as they are lowered onto pallet support surfaces 341a and 342a, respectively. These sloped camming surfaces also assist in the smooth removal of pallets from the storage bays.

Figure 5:
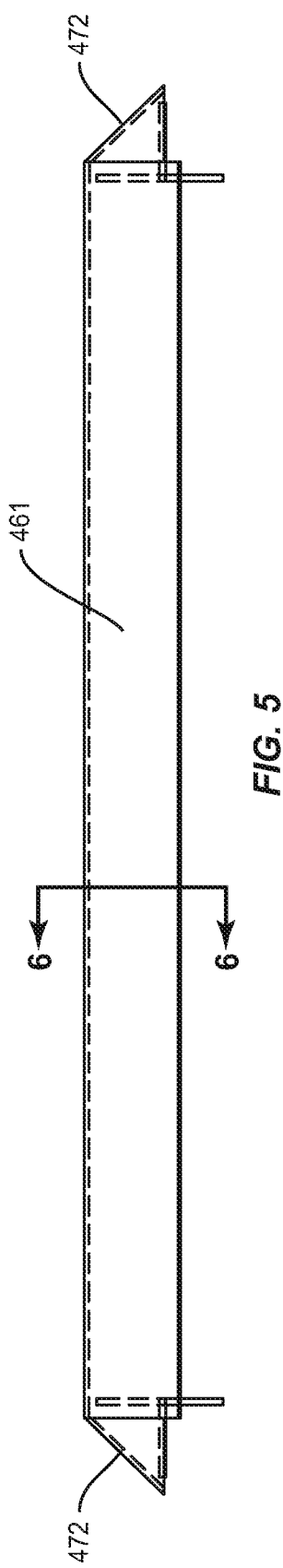
FIG. 5 is a side view of a centering cam for use with a central divider, in accordance with a preferred embodiment of the invention.
Figure 6:
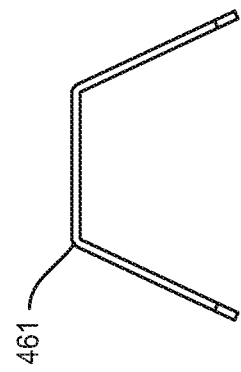
FIG. 6 is a partial cross-sectional view of a section of the centering cam of FIG. 5, taken along line 6-6.

The sloped guiding surfaces of centering guide ramps 461, 462 and 463 should be about 80°-50° from a horizontal plane, preferably about 70°-60°, most preferably about 65°. It should have a vertical height over 2 inches, preferably about 3 to 5 inches, most preferably about 4 inches. Centering guide 461 is also shown in side view and cross-sectional view in FIGS. 5 and 6, respectively. The top surface of centering guide 461 should be narrow enough, for the tight stacking of pallets. Accordingly, it should be less than about 5 inches and more preferably, less than about 4 inches wide, most preferably about 3.5 inches wide. For similar reasons, the base of centering guide 461 should be less than 9 inches wide, preferably less than 8 inches wide and most preferably about 7 inches wide. A front end 472 and a rear end 473 should also be beveled, to assist with smooth movement of pallets in the bay. Thus, ends 472 and 473 should be at an angle of about 30° to 60°, preferably 40° to 50° and most preferably about 45° to horizontal.

Figure 7:
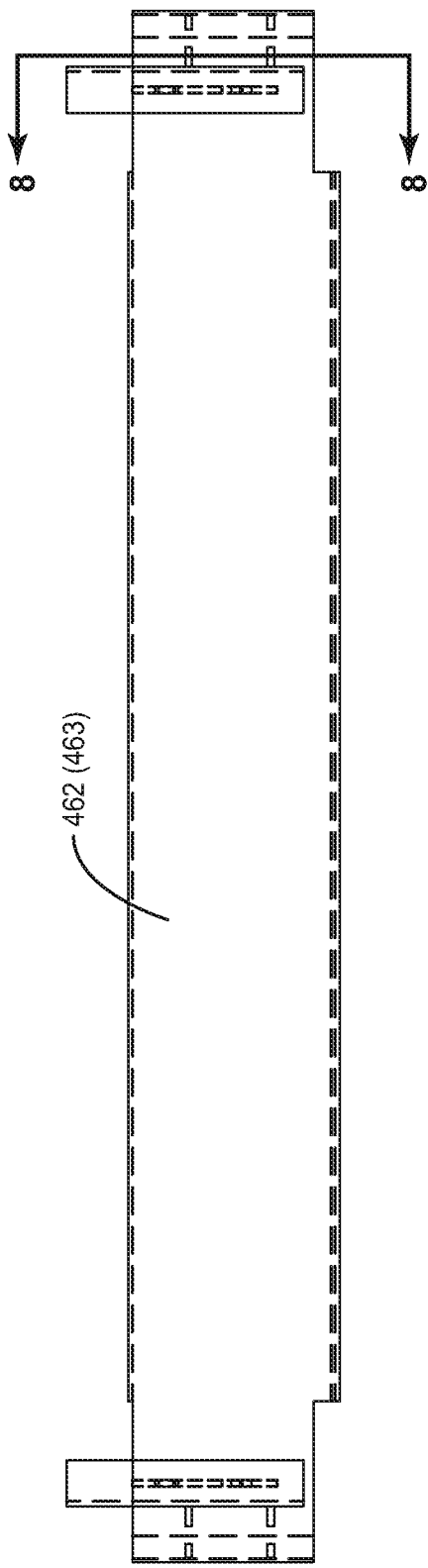
FIG. 7 is a side view of a side centering cam, in accordance with a preferred embodiment of the invention.
Figure 8:
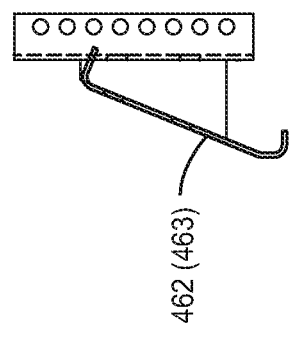
FIG. 8 is a cross-sectional view of the side centering cam of FIG. 7, taken along line 8-8, in accordance with a preferred embodiment of the invention.

Left or right side centering guide 462 or 463 is shown in side view in FIG. 7. An end cross-sectional view of side centering guide 462 (463), taken along line 8-8, is shown in FIG. 8. As shown in FIG. 8, side centering guide 462 (463) has a C-channel construction and is angled with a slope from horizontal, to provide a camming surface, to assist in the proper insertion and removal of pallets from bay 330. Preferably, this angle is about 60° to 80°, more preferably 65° to 75° and most preferably, about 68° from a horizontal plane at the bottom of the slope. Side centering guide 462 (463) should be about 5 to 8 inches in vertical height, preferably about 6 to 7 inches high from a bottom portion thereof.

Figure 9:
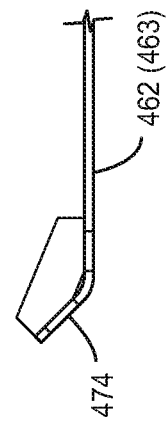
FIG. 9 is a partial top view of the end of the centering cam of FIG. 7.

An end 474 of side centering guide 462 (463) should be beveled outward, to promote smooth insertion and removal of pallets from bay 330. A top view of the end of side centering guide 462 (463) is shown in FIG. 9. This angle should be about 35° to 55°, preferably 40° to 50°, most preferably about 45° from the camming surface of side centering guide 462 (463).

Each bay 330 should have an inner clearance of about 92 inches to store pallets side-by-side. 90 to 94 inches inner clearance is acceptable, 91-93 is preferred. The height of each bay should be able to store a pallet-plus-goods at least 52 inches high, preferably 55-60 inches. The spacing between the pallet support surfaces should be at least 35 inches, 35-45 inches is preferred, 38-42 inches is more preferred and about 39.5-40.5 inches is most preferred. About 2-6 inches clearance should be provided between the pallets and goods and either the adjacent pallet or the adjacent vertical support. About 3.5-4.5 inches is more preferred.

The respective ends of the cart support surfaces of the support rails should be sufficiently close to each other, to permit the pallets in the left and right rows of a bay to be close enough to be accessed by a dual fork forklift. Preferably, the ends of the cart support surfaces should be about 10-15 inches apart, preferably 12-14 inches apart, most preferably 13-13.25 inches. The outer edges of the pallet support surfaces supported by the central divider should be about 6-10, preferably 7-9, most preferably 7.5-8.5 inches apart.

The horizontal beams should be strong enough to hold two pallets plus goods, totaling at least about 2000 pounds each, preferably over about 2500 pounds each and even up to 3000 pounds each. Accordingly, the horizontal beams should be formed from 4 gauge quarter-inch thick steel. The side and centering guides should be strong enough to guide the pallets into position without being deformed by the process. The beams should have a C-channel construction. In particular, the horizontal beam should be formed from ¼ inch hot rolled structural steel with a C-channel structure.

Note that where this application has listed the steps of a method or procedure in a specific order, it may be possible, or even expedient in certain circumstances, to change the order in which some steps are performed, and it is intended that the particular steps of the method or procedure claim set forth herebelow not be construed as being order-specific unless such order specificity is expressly stated in the claims.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A pallet positioning guide, comprising:
a camming body adapted to guide a pallet of goods weighing at least 2000 pounds, without suffering deformation, onto an upwardly facing pallet support surface constructed and positioned to support the edges of the pallet, the pallet support surface located on a plane vertically below the camming body, the camming body elongated in a rearward direction from a camming body front portion, along a rearward horizontal length axis, to a camming body rear portion, opposite the front portion, with a central portion between the front portion and the rear portion of the camming body;
the central portion having a camming slope in a sloped sideways direction from a top portion of the camming slope to a bottom portion of the camming slope, the camming slope defining a sloped plane forming an angle to a horizontal plane at the bottom portion of the camming slope, the camming slope adapted to guide an edge of the pallet in the sideways and downward direction towards the bottom portion of the camming slope;
a connection strip at the front portion of the camming body, extending vertically and adapted to attach the camming body to a vertical column and securely support the camming body in place as the camming slope guides the pallet to the bottom portion of the camming slope; and
the front portion of the camming body comprises a beveled guide surface, beveled in a horizontal direction toward the connection strip, and adapted to guide the pallet in contact with the beveled guide surface in the longitudinal and sideways directions toward the camming surface and away from the connection strip.

2. The pallet positioning guide of claim 1, wherein the camming slope is at an angle of about 50° to 80° to the horizontal plane.

3. The pallet positioning guide of claim 1, wherein the camming slope is at an angle of about 55° to 75° to the horizontal plane.

4. The pallet positioning guide of claim 1, wherein the camming slope is at an angle of about 60° to 70° to the horizontal plane.

5. The pallet positioning guide of claim 1, wherein the connection strip includes a plurality of bolt receiving holes.

6. The pallet positioning guide of claim 1, wherein the central portion has a vertical height of about 5 to 8 inches.

7. The pallet positioning guide of claim 1, wherein the central portion has a vertical height of about 6 to 7 inches.

8. The pallet positioning guide of claim 1, wherein the beveled guide surface is beveled at an angle of about 35° to 55° to the camming slope.

9. The pallet positioning guide of claim 1, wherein the beveled guide surface is beveled at an angle of about 40° to 50° to the camming slope.

10. The pallet positioning guide of claim 1, in combination with a mirror image positioning guide comprising a mirror image of the elongated camming body.

11. A pallet positioning guide, comprising:
a connection strip having a plurality of bolt receiving holes therethrough;
a camming surface attached to the connection strip and extending in a rearward horizontal direction perpendicular to a vertical direction from a front portion to a rear portion of the camming surface, a plane of the camming surface at an angle of about 55° to 80° to a horizontal plane at a bottom of the camming surface;
the front portion of the camming surface having a bevel surface and a plane of the bevel surface is at an angle of about 35° to 55° to the plane of the camming surface.

12. The pallet positioning guide of claim 11, wherein the camming surface is at an angle of about 55° to 75° to the horizontal plane.

13. The pallet positioning guide of claim 11, wherein the camming surface is at an angle of about 60° to 70° to the horizontal plane.

14. The pallet positioning guide of claim 11, wherein the camming surface has a height in the vertical direction of about 5 to 8 inches.

15. The pallet positioning guide of claim 13, wherein the central portion has a height in the vertical direction of about 6 to 7 inches.

16. The pallet positioning guide of claim 11, wherein the plane of the bevel surface at an angle of about 40° to 50° to the plane of the camming surface.

17. The pallet positioning guide of claim 15, wherein the plane of the bevel surface at an angle of about 40° to 50° to the plane of the camming surface.

18. The pallet positioning guide of claim 11, wherein the positioning guide comprises a second connection strip attached to a second camming surface, spaced apart from the connection strip and the camming surface, the second connection strip and the second camming surface configured as a mirror image of the connection strip and the camming surface.

19. The pallet positioning guide of claim 12, wherein the camming surface has a height in the vertical direction of about 5 to 8 inches.

20. The pallet positioning guide of claim 19, wherein the plane of the bevel surface at an angle of about 40° to 50° to the plane of the camming surface.

\* \* \* \* \*